Patented May 9, 1933

1,908,376

UNITED STATES PATENT OFFICE

MARTIN LUTHER, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF SULPHONATED PRODUCTS

No Drawing. Application filed August 9, 1928, Serial No. 298,629, and in Germany August 11, 1927.

The present invention relates to the production of sulphonated products.

In the application Ser. No. 237,983, filed December 5th, 1927, applicant conjointly with another has described a process for the liquid phase production of highly oxidized products from paraffin hydrocarbons, waxes and the like, in which the oxidation products are withdrawn from the reaction mixture, before the oxidation has been completed, by means of a solvent, the unoxidized portions comprising initial material and oxygenated bodies which have not been oxidized, however, to acids, in conjunction with fresh initial material as required, being again subjected to oxidation, and so on. The resulting highly oxidized products can be further treated with sulphonating agents, for the purpose of obtaining products of the Turkey-red oil type. As is well known in the art, for example, from Journal of the Chemical Society 121 (1922) page 496, Berichte der Deutschen Chemischen Gesellschaft Vol. 53 (1920), pages 66, 922 and 1569, and Mitteilungen des Deutschen Forschungsinstitutes fur Textilstoffe 1918, page 108, in the liquid-phase oxidation of paraffin no substantial cracking of the hydrocarbons occurs if the oxidation be carried out below 200° C,. and especially when carried only to such an extent that unattacked hydrocarbon material remains, in contrast to the vapour-phase oxidation of volatile hydrocarbons which are considerably cracked and split during this oxidation with a partial condensation of the products of the cleavage. When obtained under the said liquid-phase conditions, the oxygenated products of the liquid-phase oxidation will contain about the same number of carbon atoms as the initial materials, of which paraffin is known to contain hydrocarbons containing from about 12 to 36 carbon atoms, mainly from about 12 to about 24 carbon atoms (compare for example Berichte der Deutschen Chemischen Gesellschaft, Vol. 40 (1907), page 4779). In accordance with the said statements water-insoluble fatty acids containing from 10 to about 35 carbon atoms, mainly from 11 to 24 carbon atoms, have been identified in the liquid phase oxidation products from paraffin (according to the aforesaid citations, Chemiker Zeitung 49 (1920), page 311, and Beitschrift fur angewandte Chemi 1918, page 69). Similarly, alcohols in the said oxidation products contain from about 10 to 25 carbon atoms (see Journal of the Chemical Society 1926, page 2377), lauryl, myristyl, palmityl and stearyl or octodecyl alcohols together with alcohols containing 22, 24 and 25 carbon atoms having been found besides the corresponding myristic, jalmitic, isopalmitic, stearic and arachic acids, the alcohols having from about 12 to about 20 carbon atoms constituting generally the predominant portion of the whole mixture of alcohols.

It is also known that unsaturated alcohols of high molecular weight containing about 23 carbon atoms are obtained in the liquid phase oxidation of non-aromatic hydrocarbons of high molecular weight.

I have now found that useful sulphonation products can be obtained by sulfonating the single classes of such oxidized paraffin hydrocarbons, waxes and similar materials, such as hard and soft paraffin wax, or montan wax, which, for the sake of brevity, will be referred to in the following and in the claims as paraffinic bodies, from which only the unaltered initial materials have been completely or partially removed. The neutral, unsaponifiable oxidation products may be sulphonated to produce water soluble compounds as well as the highly oxidized, acid oxidation products.

The unaltered initial materials may be removed in various ways. For example, the crude oxidation product may be saponified, and the neutral oxidation product separated from the soap solution and then from the mixture of unsaponifiable matter usually consisting of unattached initial material and alcohols, by sweating, or extracting with solvents. The neutral oxidation product may be recovered also by extracting the oxidized portions from a crude oxidized paraffin wax or the like, with methanol or another solvent, and separating the acids therefrom by means of an alkaline agent. According to the object in view, the acid or neutral oxidation products can be sulphonated independently.

The term "sulphonated", wherever it occurs, is meant to define that the products have been acted upon with a sulphonating agent so that, as is well known in the art, sulphuric esters, or sulphonic acids, or mixtures of both, may be obtained, depending on the nature and quantity of the usual sulphonating agents employed.

The sulphonation products obtained in this manner can be advantageously employed for the preparation of soaplike products, as for example similar to Turkey-red oil, for use in the textile industry, as emulsifying agents, and the like.

The following examples will further illustrate the nature of the said invention which however is not limited thereto.

Example 1

An oxidation product from soft paraffin wax, with the saponification value 210, is saponified with the theoretical amount of caustic soda solution. The solution is then left to stand in the warm, whereupon the unsaponifiable matter, consisting of unaltered paraffin wax and neutral oxidation products, collects, with the exception of a small remainder, on the surface. The unsaponifiable matter is then separated and carefully warmed, whereupon the oxygen compounds pass into the liquid condition and can be easily drawn off, whilst the unaltered paraffin wax remains in the solid state. One part of 10 per cent oleum is stirred into 3 parts of the resulting oil, at about 35° C., and a water soluble oil is obtained which constitutes an excellent wetting and emulsifying agent and can be advantageously employed for the production of products similar to Turkey-red oil or the product known in the trade as monopol soap, for use in the textile industry and as emulsifying agents.

Example 2

An oxidation product from hard paraffin wax, with the saponification value 200, is filtered off, by suction, from the unaltered initial material, the temperature being gradually raised to 42° C. The separated liquid constituents are saponified, the unsaponifiable matter is removed, and the acids are set free from the soap solution, 10 parts of the resulting acids being then treated with 3 parts of chlorosulphonic acid at from 40° to 45° C. The unsaponifiable matter is sulphonated with oleum, as described in Example 1. The sulphonic acids obtained in each case can be used in place of Turkey-red oils.

What I claim is:

1. The process for the production of sulphonated products from unsaponifiable products obtained by the incomplete liquid phase oxidation of a paraffinic body having a boiling point approximately that of paraffin wax, saponificiation of the acid constituents of the resulting oxidation product and separation of the unsaponifiable oxidation products while removing non-oxidized initial material at any stage, which comprises acting on at least part of the said unsaponifiable oxidation products with a sulphonating agent.

2. The process for the production of sulphonated products from unsaponifiable products obtained by the incomplete liquid phase oxidation of a paraffinic body having a boiling point approximately that of paraffin wax, saponification of the acid constituents of the resulting oxidation product and separation of the unsaponifiable oxidation products while removing non-oxidized initial material at any stage, which comprises acting on the said unsaponifiable oxidation products with oleum.

3. The process for the production of sulphonated products from unsaponifiable products obtained by the incomplete liquid phase oxidation of paraffin wax, saponification of the acid constituents of the resulting oxidation product and separation of the unsaponifiable oxidation products while removing non-oxidized initial material at any stage, which comprises acting on the said unsaponifiable oxidaton products with a sulphonating agent.

4. The process for the production of sulphonated products from unsaponifiable products obtained by the incomplete liquid phase oxidation of paraffin wax, saponification of the acid constituents of the resulting oxidation product and separation of the unsaponifiable oxidation products while removing non-oxidized initial material at any stage, whch comprises acting on the said unsaponifiable oxidation products with oleum.

5. A composition of matter having soaplike and emulsifying properties consisting essentially of a sulphonated mixture of alcohols containing from 10 to 25 carbon atoms obtainable by the liquid-phase oxidation of paraffin wax.

6. A composition of matter having soaplike and emulsifying properties consisting essentially of a sulphonated mixture of alcohols in which alcohols having from 12 to 20 carbon atoms predominate and which is obtainable by the liquid-phase oxidation of paraffin wax.

7. The sulphonation products of the unsaponifiable oxidation products obtained by the liquid phase oxidation of paraffin hydrocarbons having a boiling point approximating that of paraffin wax, said unsaponifiable oxidation products being substantially free from hydrocarbons and acid oxidation products.

8. The sulphonation products of unsaponifiable oxidation products obtained by the liquid phase oxidation of paraffin wax, said unsaponifiable oxidation products being substantially free from hydrocarbons and acid oxidation products.

9. The sulphonated neutral fractions of the liquid phase oxidation of paraffin wax essentially comprising mixtures of alcohols.

10. Sulphonated mixtures of alcohols obtained by the liquid phase oxidation of paraffin wax.

In testimony whereof I have hereunto set my hand.

MARTIN LUTHER.